United States Patent

Erickson

[15] 3,650,653
[45] Mar. 21, 1972

[54] MOLD ASSEMBLY FOR MOLDING CHIMED CONTAINERS

[72] Inventor: Gerald Erickson, P.O. Box 6175, Surfside, Fla. 33154

[22] Filed: Oct. 13, 1969

[21] Appl. No.: 865,656

[52] U.S. Cl. .............................. 425/218, 425/806, 425/450
[51] Int. Cl. ................................... B29c 17/07, B29d 23/03
[58] Field of Search ................... 18/2 RM, 5 BB, 5 BM, 5 BP, 18/5 BR, 5 BS, 5 BZ, 35, 42 D, 42 M, DIG. 58, DIG. 5, 34 R; 249/58

[56] References Cited

UNITED STATES PATENTS

| 2,900,666 | 8/1959 | Marcus | 249/58 |
| 3,004,285 | 10/1961 | Hagen | 18/5 BZ X |
| 3,050,773 | 8/1962 | Hagen | 18/5 BZ X |
| 3,091,803 | 6/1963 | Scott, Jr. et al. | 18/5 BA |
| 3,313,875 | 4/1967 | Magerle | 18/36 X |
| 3,373,460 | 3/1968 | Ladney, Jr. | 18/DIG. 58 |
| 3,458,897 | 8/1969 | Roger | 18/5 BS |

FOREIGN PATENTS OR APPLICATIONS

| 1,314,044 | 11/1962 | France | 18/5 BB |
| 1,176,829 | 8/1964 | Germany | 18/5 BZ |

Primary Examiner—Robert D. Baldwin
Assistant Examiner—Donald M. Gurley
Attorney—Brumbaugh, Graves, Donohue & Raymond

[57] ABSTRACT

A mold assembly for molding a container having chimes at opposite ends which mold assembly is composed of a plurality of relatively movable mold sections for molding the body of the container, a chime-molding section for molding at least part of one of said chimes and means for moving the chime-molding section from a molding position interlocking with the molded container to a disengaged position to facilitate removal of the chimed container from the mold.

3 Claims, 9 Drawing Figures

Patented March 21, 1972 3,650,653

INVENTOR.
GERALD ERICKSON
BY
his ATTORNEYS

INVENTOR.
GERALD ERICKSON

INVENTOR.
GERALD ERICKSON

Patented March 21, 1972  3,650,653

INVENTOR.
GERALD ERICKSON
BY
Brumbaugh, Graves, Donohue
& Raymond
his ATTORNEYS 3,650,653

MOLD ASSEMBLY FOR MOLDING CHIMED CONTAINERS

This invention relates to a novel mold assembly for molding a container of the type having chimes at both ends in order to make it possible for a cluster of the containers to be packaged together in a container carrier.

A chimed container and a container carrier for locking a cluster of the chimed containers together is described in my U.S. Pat. No. 3,298,514, issued Jan. 17, 1967.

The novel mold assembly of the present invention is composed of a plurality of mold sections which form the body of a chimed container and are relatively movable from a closed molding position to an open position to facilitate removal of the molded container from the mold, at least one chime-molding section movable relative to said body-molding sections to form at least part of one of said chimes, and means for moving the chime-molding section from a molding position interlocking with the molded container to a disengaged position to facilitate removal of the chimed container from the mold.

For a complete understanding of the present invention, reference can be made to the detailed description which follows and to the accompanying drawings in which.

The mold assembly shown in FIGS. 1 through 5 comprises a pair of mold sections 10 and 11 pivotally mounted together on a vertical hinge 12, and a lower mold section 13.

Figures 1, 2, 3:
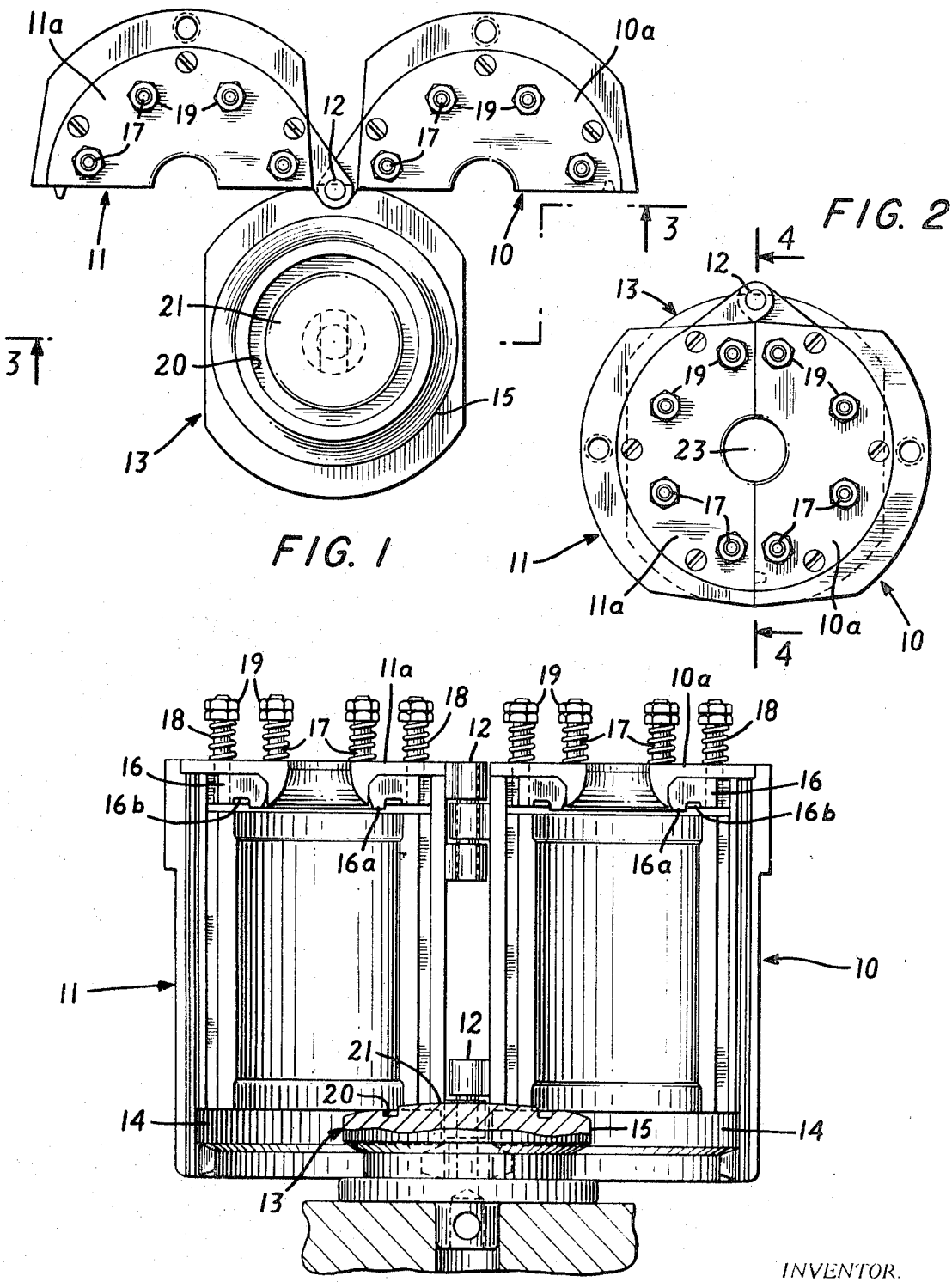
FIG. 1 is a plan view of the mold assembly of the present invention with the body-molding sections thereof in open position.
FIG. 2 is a plan view of the mold assembly shown in FIG. 1 with the body-molding sections closed.
FIG. 3 is a view taken along the line 3—3 of FIG. 1 looking in the direction of the arrows.

The mold sections 10 and 11 are provided with lower concave seals 14 which are of complementary shape to the outer periphery of the circular sealing edge 15 of the lower mold section 13. When the mold sections 10 and 11 are closed, as shown in FIG. 2, the concave seals 14 are in engagement with the outer periphery 15 of the lower mold section.

Figure 4:
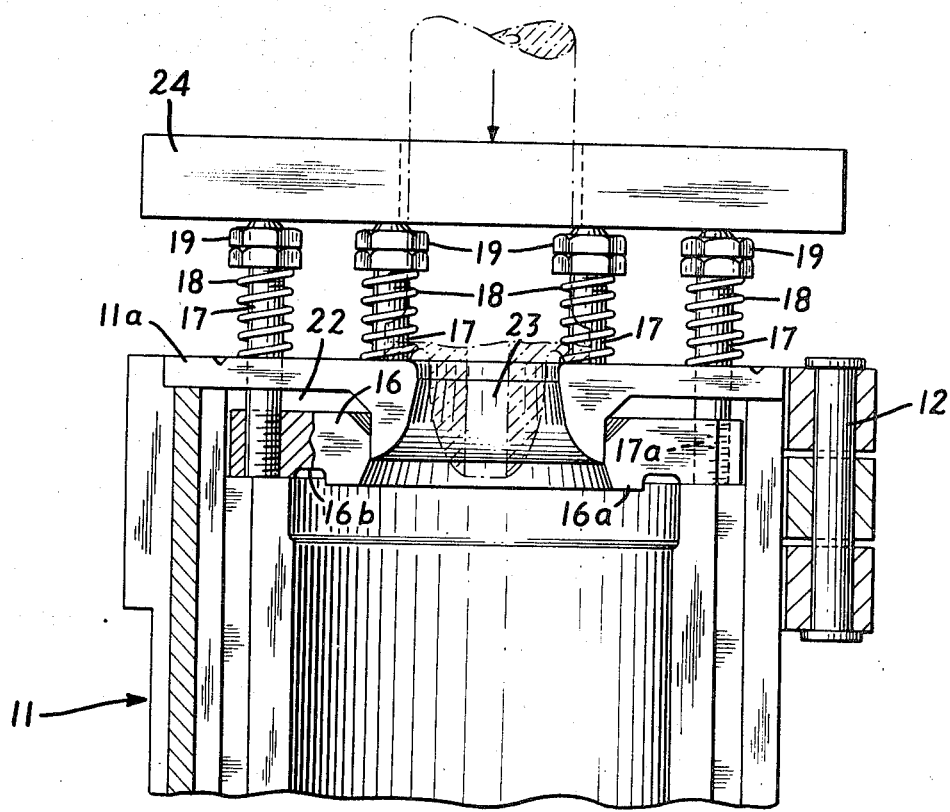
FIG. 4 is a view taken along the line 4—4 of FIG. 2 looking in the direction of the arrows.
Figure 5:
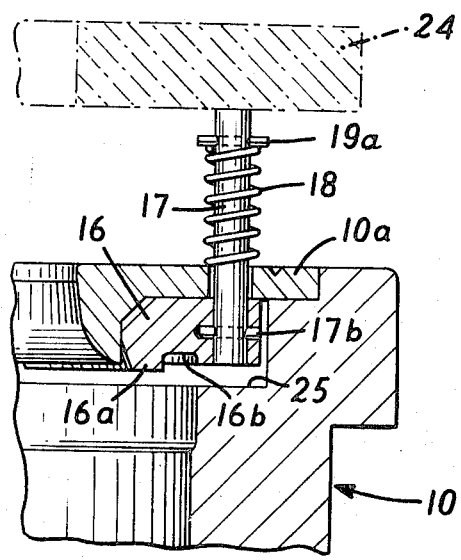
FIG. 5 is a fragmentary cross-sectional view of part of the mold assembly shown in FIG. 4.

The mold sections 10 and 11 each carry a vertically movable, semicircular mold section 16 having an inner downwardly depending lip 16a and an outer recess or groove 16b adjacent the lip. Each of the mold sections 16 has affixed thereto a plurality of upstanding pins 17 which extend upwardly through and are guided in the cover plates 10a and 11a, respectively, of the mold sections 10 and 11. Each pin 17 accommodates thereon a compressed spring 18 interposed between the respective cover plate and a spring retainer. The spring retainer is shown in FIGS. 1 through 4 in the form of a pair of locking screws 19 and in FIG. 5 in the form of transverse pin 19a. The pin 17 can be threaded at 17a to connect it to the mold section 16 as shown in FIG. 4 or connected therewith by a pin 17b as shown in FIG. 5.

The upper surface of the lower mold section 13 has formed thereon a circular groove 20 which encircles a raised convex surface 21. The groove 20 forms the lower chime of the container and the raised surface 21 forms the base of the container.

The inner surfaces of the mold sections 10 and 11 form the body of the container, the grooves 16b of the mold sections 16 form the upper chime and the lips 16a form the recessed surfaces of the containers adjacent the upper chimes.

The semicircular mold sections 16 are urged by the springs 17 into the semicircular recesses 22 formed in the upper ends of each of the mold segments 10 and 11. Before the glass or plastic material from which the container is molded is introduced into the mold through the opening 23 defined in the mold cover plates 10a and 11a, an actuator 24 descends and simultaneously depresses all of the pins 17 to move the semicircular mold segments 16 down to their molding positions shown in FIG. 4 against the shoulders 25 of the mold segments 10 and 11.

The molding material is introduced into the mold from a nozzle (not shown) which snugly engages the walls defining the mold inlet 23. When the molding operation has been completed, the nozzle is raised and the actuator 24 rises, permitting the springs 18 to lift the semicircular mold segments and return them to their raised positions within the recesses 22. The depending lips 16a which form the recessed surfaces adjacent the upper chimes of the container are thus disengaged from the upper chime. The mold sections 10 and 11 are then pivoted relative to the lower mold section 13 and away from each other to the positions shown in FIG. 1, and the molded container is removed from the lower mold section 13.

Because of the relatively high temperatures to which the mold assembly must be subjected in the molding operation (up to 2,000° F. in glass blowing), it is desirable that the springs 18 be constructed out of a high heat-resistant material, such as inconel-x, and located outside and above the upper section of the mold.

Figure 6:
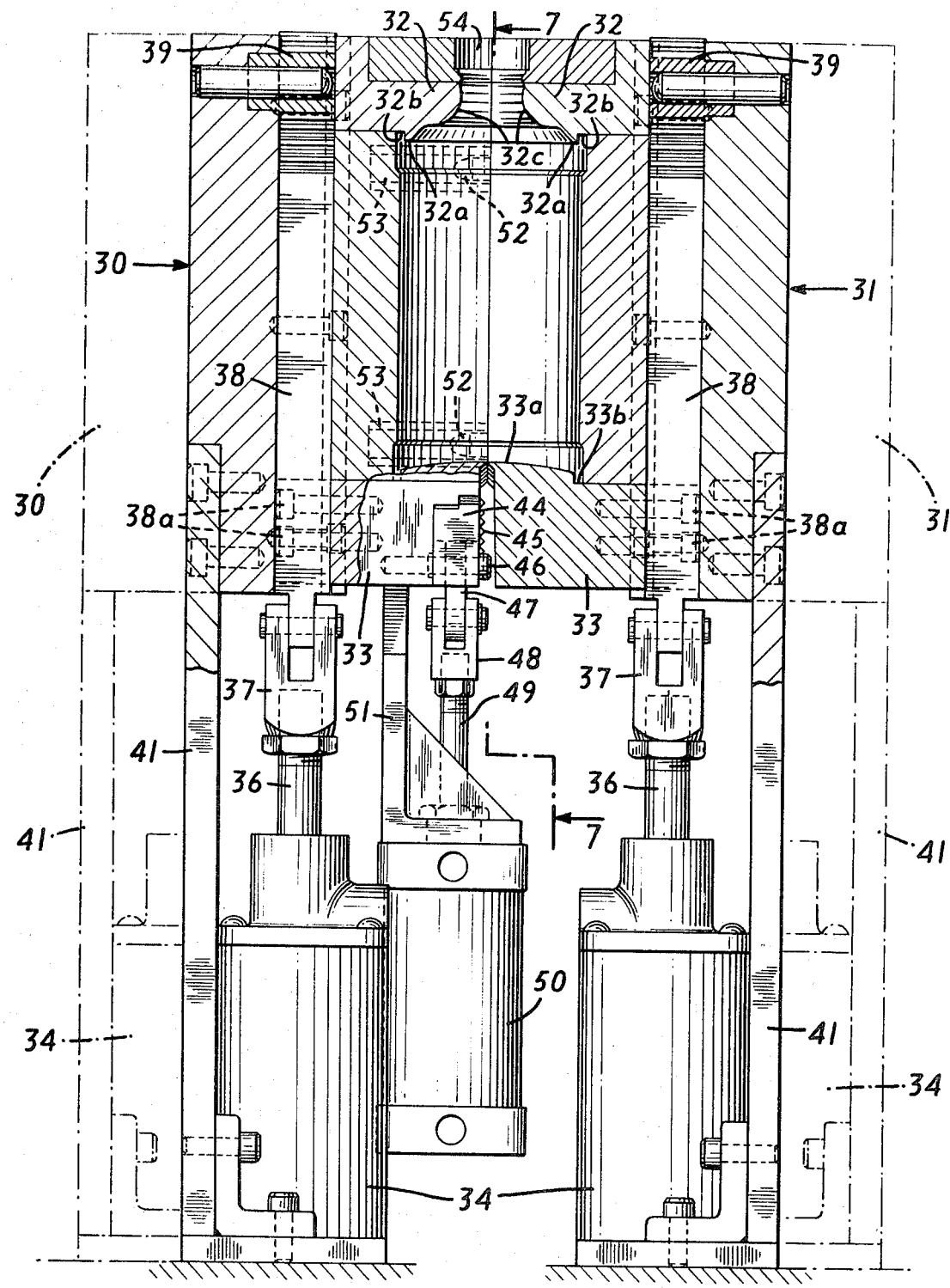
FIG. 6 is an elevational cross-sectional view of another embodiment of the mold assembly of the present invention.
Figure 7:
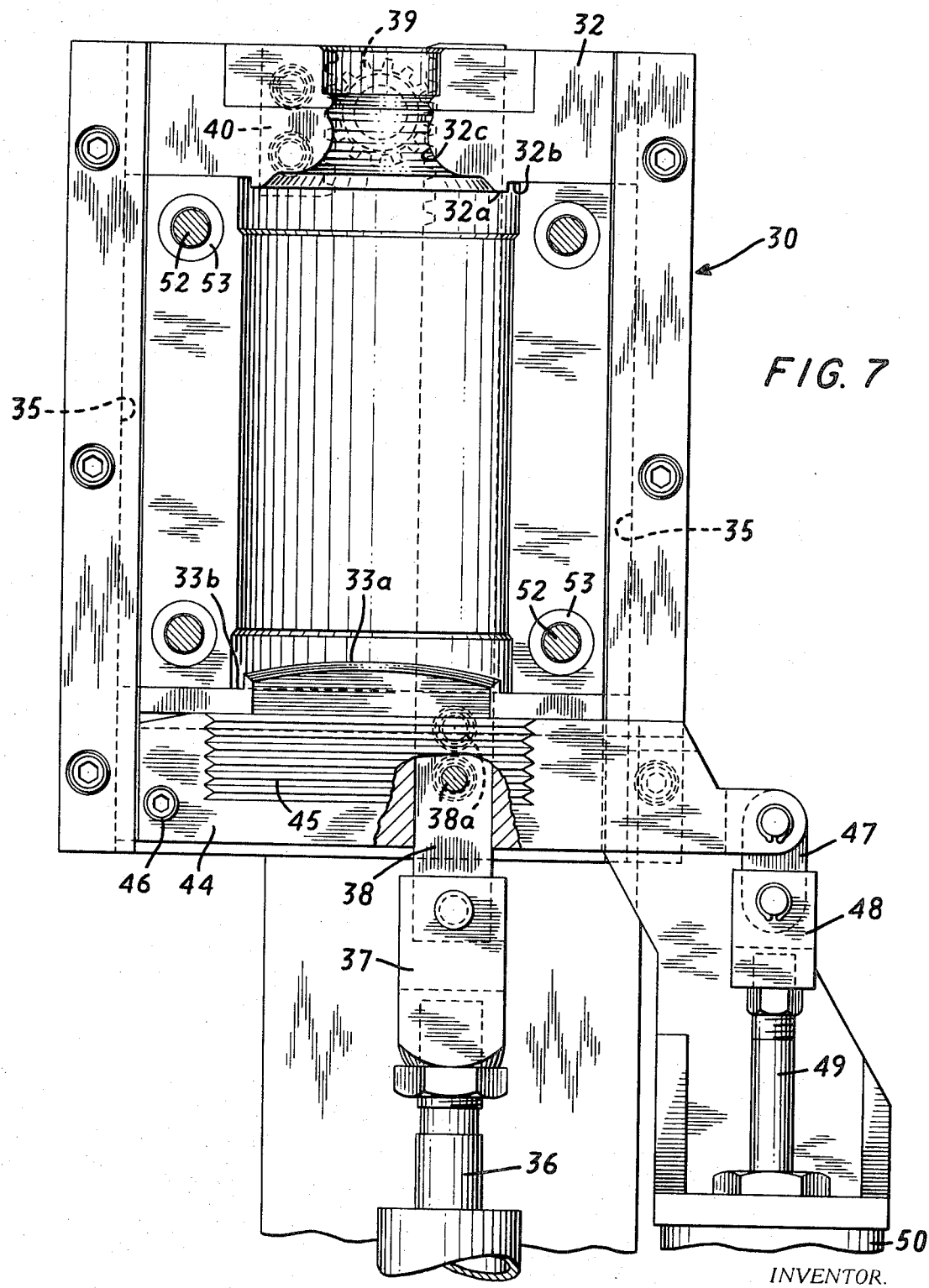
FIG. 7 is a view taken along the line 7—7 of FIG. 6 looking in the direction of the arrows.
Figure 8:
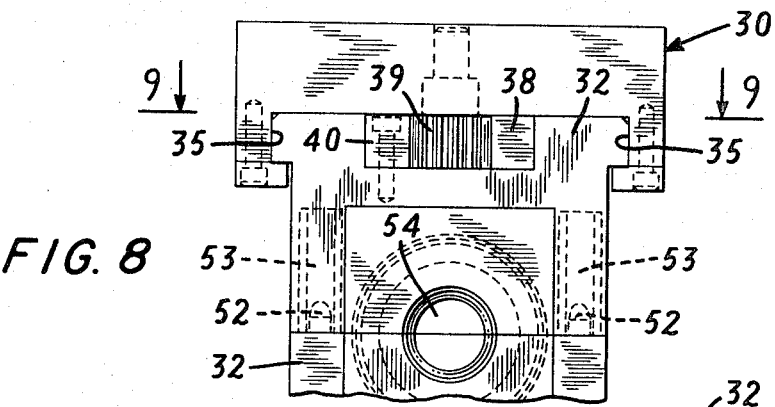
FIG. 8 is a fragmentary plan view of part of the mold assembly shown in FIG. 7.
Figure 9:
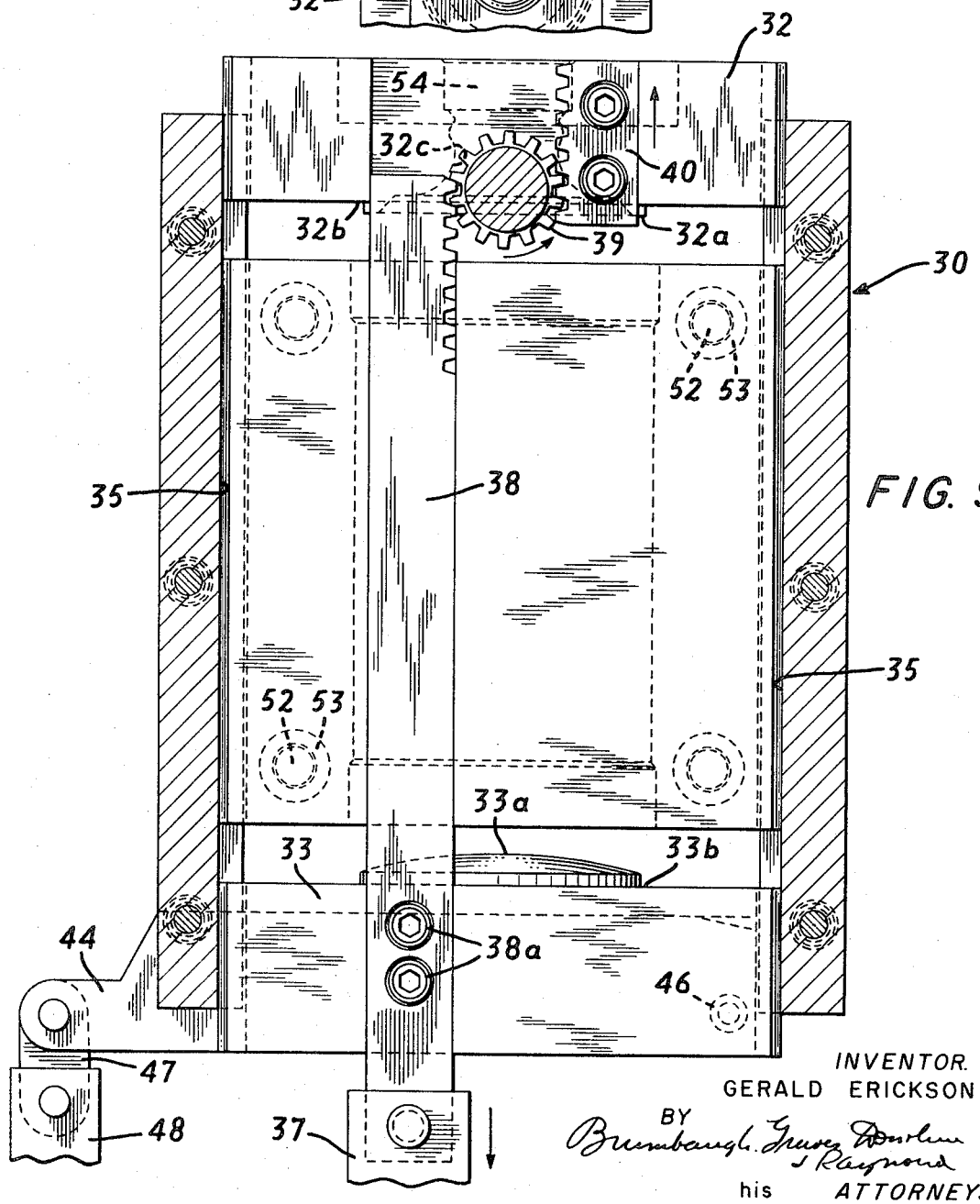
FIG. 9 is an elevational cross-sectional view taken along the line 9—9 of FIG. 8 looking in the direction of the drawings.

In the embodiment illustrated in FIGS. 6 through 9, the mold assembly comprises a pair of oppositely disposed, complementary mold sections 30 and 31 which are movable relatively to each other from the closed position shown in solid lines in FIG. 6 to the open position shown in phantom lines therein. Each of the mold sections 30 and 31, in turn, carries an upper mold section 32 and a lower mold section 33 which are accommodated in vertical guides 35 (see FIG. 9) of the mold section with which they are associated. As will be explained more fully below, the upper and lower mold sections 32 and 33, respectively, are moved from their molding positions shown in FIGS. 6 and 7 to their spaced-apart release positions shown in FIG. 9 by an actuator 34.

The mold sections 30 and 31 form the body of the chimed container. The complementary, upper mold sections 32 carried by the mold sections 30 and 31 cooperate to form the upper chime and neck of the container, and the complementary lower mold sections 33 carried by the mold sections 30 and 31 cooperate to form the lower chime and base of the chimed container. Toward this end, each of the upper mold sections 32 has a semicircular lip 32a depending from the bottom thereof adjacent a recessed portion 32b, and this configuration cooperates with the molding surface of the respective mold section 30 or 31 to form the upper chime of the container. The inner surfaces 32c of the upper mold sections 32 form the container neck and the inlet passage 54 to the mold. Each of the complementary lower mold sections 33 has an upwardly extending convexly curved portion 33a adjacent a recessed surface 33b, and this configuration cooperates with the molding surface of the respective mold section 30 or 31 to form the lower chime and bottom of the container.

The upper mold section 32 and lower mold section 33 associated with each of the mold sections 30 and 31 are moved toward each other simultanesouly and away from each other simultaneously by the operation of the respective actuator 34 through a drive transmission which includes a vertically movable rod 36 connected to the actuator, a linkage 37 connected to the rod, a vertically movable rack 38 connected to the lower mold section 33 and extending to the upper region of the respective mold section, a spur gear 39 rotatably mounted within the respective mold section and driven by the rack 38, and a rack 40 connected to the respective upper mold section 32 and driven by the spur gear 39. The actuator 34 is preferably a double acting air piston and cylinder, the latter being mounted to a bracket 41 and the rod 36 being connected to the movable piston. The bracket 41, in turn, is connected to the respective mold section 30 or 31.

When the molding operation has been completed and it is desired to raise each of the upper mold sections 32 to disengage them from the upper chimes of the molded container and to lower the lower mold sections 33 to disengage them from the lower chimes of the container, the actuators 34 are operated, and each drives the respective rod 36 downwardly, thereby moving the rack 38 in a downward direction. Since the rack 38 is connected to the lower mold section by screws 38a, the lower mold section 33 is carried downwardly with the rack. The downward motion of the rack 38 also imparts rotation of the spur gear 39 which, in turn, drives the rack 40 upwardly to raise the upper mold section 32.

It may be desirable to provide means associated with the lower mold sections 33 to remove any flashing which may collect and hang below the line of contact of the mold sections 30 and 31. Toward this end a member 44 (see FIGS. 6 and 7) serrated on its face to form a series of teeth 45 is pivotally connected at 46 to each of the lower mold sections 33. The free end of the member 44 is connected through a linkage 47 and a coupling 48 to a piston rod 49 of an actuator 50. The actuator 50 is preferably a double acting air cylinder and piston in which the cylinder is mounted to the respective mold section by a bracket 51 and the rod 49 is connected to the movable piston within the cylinder. When the actuator 50 drives the rod 49 downwardly, the member 44 will be moved independently of the mold section to remove the flashing.

When the mold sections 30 and 31 are moved from the closed molding position shown in solid lines in FIG. 6 to the open position shown therein in phantome lines, the mold section carries with it the actuating mechanism 34–40 for raising and lowering the respective upper mold section 32 and the actuating mechanism 47–50 for pivoting serrated member 44. Although in the embodiment illustrated in the drawings, both mold sections 30 and 31 are displaced toward and away from each other, the mold assembly can be designed such that one of the mold sections is stationary and the other moves toward and away from it. When the mold sections 30 and 31 are moved together into the molding position, proper registry therebetween is assured by the engagement of the laterally projecting pins 52 carried by the mold section 31 with the aligning sleeves 48 carried by the mold section 30.

In the operation of the mold assembly shown in FIGS. 6 through 9 of the drawings, the molding composition is introduced through a blowpin or nozzle which snugly engages mold inlet 54 defined by the complementary surfaces 32c of the upper mold sections 32 carried by each of the mold sections 30 and 31. During the molding operation, the upper mold sections 32 are in their lower operative positions and the lower mold sections 33 are in their upper molding positions as shown in FIG. 6 of the drawings.

When the molding operation has been completed, the actuator 50 pivotally moves the serrated member 44 to remove any flashing from the bottom of the assembly. The actuators 34 are then operated to raise the upper mold sections 32 and lower the lower mold sections 33 out of engagement with the chimes of the container. The mold sections 30 and 31 are then separated by actuating means (not shown) to permit removal of the molded container from the mold assembly.

The mold assembly of the present invention has been shown and described in preferred forms and by way of example only, and such details as flow passages for a liquid coolant have been omitted since they constitute no part of the present invention.

I claim:

1. A mold assembly for molding a container having an upstanding chime at the outer periphery of the upper end and a depending chime at the outer periphery of the lower end and comprising a plurality of relatively movable body-molding sections for molding the side wall of the container, an upper molding section in each body-molding section for molding part of the upper end of the container and the upper chime, a lower molding section in each body-molding section for molding part of the lower end of the container and the lower chime, guide means in each body mold section for moving the upper and lower mold sections toward each other into cooperative molding positions with the respective body-molding section and away from each other to release positions, common actuating means for moving the upper and lower molding sections associated with one of said body-molding sections and means connecting the pair of upper and lower mold sections with the common actuating means and moving said pair of upper and lower mold sections in opposite directions.

2. A mold assembly as set forth in claim 1 in which said connecting means includes a pinion mounted for rotation in each of said body-molding sections, a rack meshing with said pinion and connected to one of said pair of molding sections and the actuating means and a rack meshing with said pinion and connected to the other of said pair of molding sections.

3. A mold assembly as set forth in claim 1 including a serrated member accommodated for movement in each of said body-molding sections to remove flashing and means for actuating said serrated member.

* * * * *